(12) United States Patent
Walheim et al.

(10) Patent No.: US 10,630,713 B2
(45) Date of Patent: *Apr. 21, 2020

(54) METHOD AND TOOL TO QUANTIFY THE ENTERPRISE CONSEQUENCES OF CYBER RISK

(71) Applicant: L3 Technologies, Inc., New York, NY (US)

(72) Inventors: Thomas Patrick Walheim, Mullica Hill, NJ (US); Robert K. Gardner, Annapolis, MD (US)

(73) Assignee: L3Harris Technologies, Inc., Melbourne, FL (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/650,129

(22) Filed: Jul. 14, 2017

(65) Prior Publication Data

US 2018/0020018 A1    Jan. 18, 2018

Related U.S. Application Data

(60) Provisional application No. 62/362,417, filed on Jul. 14, 2016.

(51) Int. Cl.
| | |
|---|---|
| *H04L 29/06* | (2006.01) |
| *G06F 21/57* | (2013.01) |
| *G06F 21/50* | (2013.01) |
| *G06F 21/55* | (2013.01) |

(52) U.S. Cl.
CPC ......... *H04L 63/1433* (2013.01); *G06F 21/57* (2013.01); *G06F 21/577* (2013.01); *H04L 63/1408* (2013.01); *G06F 21/50* (2013.01); *G06F 21/552* (2013.01); *H04L 63/1425* (2013.01)

(58) Field of Classification Search
CPC ............ H04L 63/1416; H04L 63/1408; H04L 63/1441; H04L 63/1458
USPC ......................................................... 726/22
See application file for complete search history.

(56) References Cited

U.S. PATENT DOCUMENTS

| | | |
|---|---|---|
| 7,904,962 B1 | 3/2011 | Jajodia et al. |
| 8,392,997 B2 | 3/2013 | Chen et al. |
| 8,601,587 B1 | 12/2013 | Powell et al. |
| 9,276,951 B2 | 3/2016 | Choi et al. |

(Continued)

*Primary Examiner* — Evans Desrosiers
(74) *Attorney, Agent, or Firm* — Condo Roccia Koptiw LLP (57) ABSTRACT

Methods and systems are for analyzing and measuring cyber risk using analytical approaches to determine and measure the consequences and/or vulnerabilities to a system (e.g., a computer network, an enterprise network, etc.) due to cyber incidents. By evaluating and quantifying risks associated with several types of cyber incidents and/or security breaches based on a network architecture and/or system design, the cyber risk analysis tool may enable the enterprise leadership to make prudent, informed decisions on how to address individual cyber risks (e.g., determine risk policy) and/or modify existing network deployments or policies. For many institutions, enterprise objective is defined in financial terms, such as budget impact, corporate earnings, impact to balance sheet and/or reputation impact. Thus, the output of the cyber risk analysis tool may be converted to or otherwise expressed as a financial cost in order to provide useful information to decision makers.

17 Claims, 9 Drawing Sheets

(56) References Cited

U.S. PATENT DOCUMENTS

| | | |
|---|---|---|
| 9,401,926 B1 | 7/2016 | Dubow et al. |
| 2013/0132149 A1 | 5/2013 | Wei et al. |
| 2014/0137257 A1* | 5/2014 | Martinez ............. H04L 63/1433 726/25 |
| 2015/0058993 A1* | 2/2015 | Choi ................... H04L 63/1433 726/25 |

* cited by examiner

| OPERATIONAL UNIT | INFORMATION ASSET ID | INFORMATION ASSET EARNINGS IMPACTS ($M) | | | INFORMATION ASSET ASSET IMPACTS ($M) | | |
|---|---|---|---|---|---|---|---|
| | | Confidentiality Cost | Integrity Cost Rate (/Hr) | Availability Cost Rate (/Hr) | Confidentiality Cost | Integrity Cost Rate (/Hr) | Availability Cost Rate (/Hr) |
| Retail Banking | Institutional Client Information | 0 | 0 | 0 | 0 | 0 | 0 |
| Retail Banking | Consumer Client PII | 10 | 0 | 1 | 100 | 2 | 0 |
| Retail Banking | Client Account Content (dep/trans) | 0 | 1 | 10 | 10 | 5 | 0 |
| Retail Banking | Trades | 0 | 10 | 20 | 0 | 25 | 0 |
| Retail Banking | Counterparty Activity | 50 | 1 | 2 | 0 | 0 | 0 |
| Retail Banking | Pre-Filing Enterprise Information | 0 | 0 | 0 | 0 | 0 | 0 |
| Retail Banking | Loans | 10 | 20 | 2 | 0 | 0 | 0 |
| Retail Banking | Revolving Credit | 10 | 20 | 2 | 0 | 0 | 0 |
| Retail Banking | Executive Insider Data | 0 | 0 | 0 | 0 | 0 | 0 |
| Retail Banking | Corp. Financial Analysis | 20 | 25 | 25 | 2 | 10 | 0 |
| Commercial Banking | Institutional Client Information | 15 | 0 | 2 | 200 | 4 | 0 |
| Commercial Banking | Consumer Client PII | 0 | 0 | 0 | 0 | 0 | 0 |
| Commercial Banking | Client Account Content (dep/trans) | 0 | 1 | 12 | 15 | 10 | 0 |
| Commercial Banking | Trades | 0 | 0 | 0 | 0 | 0 | 0 |
| Commercial Banking | Counterparty Activity | 50 | 1 | 2 | 0 | 0 | 0 |
| Commercial Banking | Pre-Filing Enterprise Information | 0 | 0 | 0 | 0 | 0 | 0 |
| Commercial Banking | Loans | 10 | 20 | 2 | 0 | 0 | 0 |
| Commercial Banking | Revolving Credit | 10 | 20 | 2 | 0 | 0 | 0 |
| Commercial Banking | Executive Insider Data | 0 | 0 | 0 | 0 | 0 | 0 |
| Commercial Banking | Corp. Financial Analysis | 20 | 25 | 25 | 2 | 10 | 0 |
| Corporate Finance | Institutional Client Information | 0 | 0 | 0 | 0 | 0 | 0 |
| Corporate Finance | Consumer Client PII | 0 | 0 | 0 | 0 | 0 | 0 |
| Corporate Finance | Client Account Content (dep/trans) | 0 | 0 | 0 | 0 | 0 | 0 |
| Corporate Finance | Trades | 0 | 0 | 0 | 0 | 25 | 0 |
| Corporate Finance | Counterparty Activity | 0 | 0 | 0 | 0 | 0 | 0 |
| Corporate Finance | Pre-Filing Enterprise Information | 0 | 0 | 0 | 50 | 25 | 1 |
| Corporate Finance | Loans | 0 | 0 | 0 | 0 | 0 | 0 |
| Corporate Finance | Revolving Credit | 0 | 0 | 0 | 0 | 0 | 0 |
| Corporate Finance | Executive Insider Data | 0 | 0 | 0 | 80 | 40 | 1 |
| Corporate Finance | Corp. Financial Analysis | 0 | 0 | 0 | 0 | 0 | 0 |

| INFORMATION ASSET | THREAT VECTOR | CONFIDENTIALITY VULNERABILITY SCORE (0-1) | INTEGRITY VULNERABILITY SCORE (0-1) | TIME TO DETECT (min.) | TIME TO RESTORE (min.) | AVAILABILITY VLUNERABILITY SCORE (0-1) | TIME TO DETECT (min.) | TIME TO RESTORE (min.) |
|---|---|---|---|---|---|---|---|---|
| Institutional Client Information | APT.1 | 0.9936 | 0.0621 | 600 | 30 | 0.9979 | 15 | 20 |
| | APT.2 | 0.0605 | 0.0451 | 600 | 30 | 0.9844 | 15 | 20 |
| | ... | 0.0479 | 0.0918 | 600 | 30 | 0.0836 | 15 | 20 |
| | INSIDER.1 | 0.9805 | 0.0793 | 600 | 30 | 0.0783 | 15 | 20 |
| | INSIDER.2 | 0.9941 | 0.9809 | 600 | 30 | 0.0177 | 15 | 20 |
| | ... | 0.0154 | 0.0887 | 600 | 30 | 0.0530 | 15 | 20 |
| | CRIMINAL.1 | 0.9974 | 0.0620 | 600 | 30 | 0.9881 | 15 | 20 |
| | CRIMINAL.2 | 0.0752 | 0.0677 | 600 | 30 | 0.9813 | 15 | 20 |
| | ... | 0.0723 | 0.0311 | 600 | 30 | 0.0487 | 15 | 20 |
| Consumer Client PII | APT.1 | 0.9976 | 0.0983 | 900 | 40 | 0.9934 | 15 | 20 |
| | APT.2 | 0.0667 | 0.0566 | 900 | 40 | 0.9885 | 15 | 20 |
| | ... | 0.0412 | 0.0410 | 900 | 40 | 0.0720 | 15 | 20 |
| | INSIDER.1 | 0.9974 | 0.0572 | 900 | 40 | 0.0966 | 15 | 20 |
| | INSIDER.2 | 0.9925 | 0.9919 | 900 | 40 | 0.0176 | 15 | 20 |
| | ... | 0.0358 | 0.0036 | 900 | 40 | 0.0245 | 15 | 20 |
| | CRIMINAL.1 | 0.9819 | 0.0645 | 900 | 40 | 0.9817 | 15 | 20 |
| | CRIMINAL.2 | 0.0362 | 0.0213 | 900 | 40 | 0.9906 | 15 | 20 |
| | ... | 0.0313 | 0.0901 | 900 | 40 | 0.0197 | 15 | 20 |
| Client Account Content (deposits/transactions) | APT.1 | 0.9859 | 0.0186 | 900 | 1200 | 0.9803 | 3 | 120 |
| | APT.2 | 0.0518 | 0.0769 | 900 | 1200 | 0.9923 | 3 | 120 |
| | ... | 0.0394 | 0.0171 | 900 | 1200 | 0.0975 | 3 | 120 |
| | INSIDER.1 | 0.9904 | 0.0663 | 900 | 1200 | 0.0210 | 3 | 120 |
| | INSIDER.2 | 0.9982 | 0.9928 | 900 | 1200 | 0.0696 | 3 | 120 |
| | ... | 0.0381 | 0.0359 | 900 | 1200 | 0.0366 | 3 | 120 |
| | CRIMINAL.1 | 0.9957 | 0.0950 | 900 | 1200 | 0.9997 | 3 | 120 |
| | CRIMINAL.2 | 0.0483 | 0.0348 | 900 | 1200 | 0.9949 | 3 | 120 |
| | ... | 0.0009 | 0.0635 | 900 | 1200 | 0.0410 | 3 | 120 |
| ⋮ | ... | ... | ... | ... | ... | ... | ... | ... |

FIG. 8

| INFORMATION ASSET ID | INFORMATION ASSET EARNINGS IMPACTS ($M) | | | INFORMATION ASSET ASSET IMPACTS ($M) | | |
|---|---|---|---|---|---|---|
| | Confidentiality Cost | Integrity Cost Rate (/Hr) | Availability Cost Rate (/Hr) | Confidentiality Cost | Integrity Cost Rate (/Hr) | Availability Cost Rate (/Hr) |
| Institutional Client Information | 15 | 0 | 2 | 200 | 4 | 0 |
| Consumer Client PII | 10 | 0 | 1 | 100 | 2 | 0 |
| Client Account Content (dep/trans) | 0 | 4 | 60 | 50 | 40 | 0 |
| Trades | 0 | 10 | 20 | 0 | 25 | 0 |
| Counterparty Activity | 400 | 10 | 15 | 0 | 0 | 0 |
| Pre-Filing Enterprise Information | 0 | 0 | 0 | 50 | 25 | 1 |
| Loans | 10 | 20 | 2 | 0 | 0 | 0 |
| Revolving Credit | 25 | 30 | 7 | 0 | 0 | 0 |
| Executive Insider Data | 0 | 0 | 0 | 80 | 40 | 1 |
| Corp. Financial Analysis | 20 | 25 | 25 | 18 | 15 | 0 |

FIG. 9

METHOD AND TOOL TO QUANTIFY THE ENTERPRISE CONSEQUENCES OF CYBER RISK

CROSS-REFERENCE TO RELATED APPLICATIONS

This application claims the benefit of U.S. Provisional Patent Application No. 62/362,417, filed Jul. 14, 2016, the contents of which are hereby incorporated by reference in their entirety.

BACKGROUND

A cyber incident may be defined as a circumstance which leads to one or more technical failures of one or more information systems resulting in a loss of confidentiality, integrity, and/or availability to critical information. A cause of a cyber incident may be environmental, local situational (e.g., local situations that might impact people's ability to get to work), hostile, incidental, and/or accidental.

In existing cyber risk methods to, a vulnerability of the one or more information systems is determined by a subjective assessment by practitioners of the cyber defense systems. Use of subjective assessment may skew results of identical systems based on the individuals providing input.

Existing cyber risk methods depend on probabilistic distribution models to determine the likelihood of a circumstance (e.g., an event) that may cause a cyber incident. For example, existing cyber risk methods may rely upon probabilistic, stochastic measures, informed by aggregating answers to myriad questions about cyber infrastructure components, including questions about their usage and maintenance. The probabilistic distribution models (e.g., such as the Monte Carlo method) may be dependent on large pools of actuarial data to establish probability with accuracy and precision. Available actuarial data for cyber incidents may be limited compared to other uses of these models. Probabilistic distribution models based on event frequency, may minimize the impact of one or more most significant events (e.g., because the low frequency artificially degrades their significance in the modeling). Thus, such probabilistic distributions may not accurately characterize the risk associated with low probability but highly damaging events.

Existing cyber risk methods to assess vulnerabilities use generic, industry cyber defense systems as a factor in determining the impact of a cyber incident. Using generic, industry cyber defense systems may dilute the value of information to individual enterprises as all information systems and cyber defense systems are unique.

SUMMARY OF THE INVENTION

Methods and systems are disclosed for analyzing and quantitatively measuring cyber risk associated with one or more network deployments. The methods and systems may be used to analyze a computer network architecture, identify the relative importance of information and systems included in the computer network, identify potential attack/stress points within the network, and determine the potential losses/relative risk levels associated with different types of attack. In this manner, by associating different informational assets in the computer network with relative levels of importance/risk of attack, different types of attacks can be modeled/analyzed in order to determine the potential risks/costs associated with numerous types of attacks. When multiple types of attacks are considered, an overall threat or risk level associated with the network can be considered. The results of the analysis may be used to change the security systems associated with the network and/or to change the overall network architecture in order to make the network more resilient to attacks and/or lower or minimize potential losses associated with various types of cyber-attacks.

The cyber risk analysis tool may comprise a processor and memory configured to use analytical approaches to determine and measure the consequences to an enterprise network due to cyber incidents. By evaluating the network behavior and configuration information and applying appropriate weights to system behavior and/or the relative importance of information assets affected by cyber-attacks, accidents, and/or failures, the result of the analysis may enable the generation of detailed risk or cost profile associated with cyber-attacks, which may be used to make prudent, informed decisions on how to prioritize attention and/or resources applied to network maintenance and/or cyber risk management (e.g., Cyber Risk Policy).

The output of the cyber risk analysis tool may be expressed in different manners depending on the desired use of the output. For example, the output may be a risk metric and/or converted to or otherwise expressed as a financial cost in order to provide useful information to decision makers about a total potential liability of the underlying network and its information assets. For many institutions, expressing the overall system vulnerabilities in a financial term may allow for cyber risk to be considered in various business decisions such as budget impact, corporate earnings, impact to balance sheet, and/or reputation impact. Further, by expressing the output in financial terms, changes to the underlying network architecture could also be evaluated to determine whether the change would result in a lower cyber-attack system risk. While the financial terms example is used to demonstrate the method herein, the method described herein is applicable to other enterprise objective indicators, such as reputation, public confidence, public safety, service availability, physical health, and/or lives. The concatenation and transformations (of the specific behavior(s) of cyber information systems, with the organization operating behavior and enterprise key financial and/or reputational factors may be used to determine cyber risk results that are directly applicable to the various types of stakeholders.

The cyber risk analysis tool may quantitatively measure the financial and/or reputation impact(s) of cyber risk(s) on an enterprise. The financial and/or reputation impacts of cyber risk may be measured based on deterministic methods, resulting in quantitative risk indicators such that users may establish risk management priorities and/or appropriate expenditures commensurate with exposure. The cyber risk analysis tool (and associated tool) may determine a risk result under certain predetermined attack scenarios with a relatively high level of precision.

The methods disclosed herein quantify the consequence of cyber incidents on an institution's stakeholder interests, e.g., based on the behavior of the specific systems of the institution systems against specific attack scenarios. The consequences may include impacts to earnings, capital, share value, volatility, and/or reputation. The consequences may include impacts to public safety, service availability, physical health, and/or lives.

BRIEF DESCRIPTION OF THE DRAWINGS

FIG. 8 depicts an example of a threat vector vulnerabilities matrix.

DETAILED DESCRIPTION

Systems and methods for a cyber risk analysis tool may be used to determine quantitative and/or accurate measurements of a consequence of a cyber incident on an enterprise network. The analysis of network attacks may be used to evaluate changes in network architecture in order to lessen the adverse consequences of an attack and/or to make effective evaluations of how different types of attacks can affect the enterprise. For example, the cyber risk analysis tool may enable optimization and/or enhancement of the network architecture. Optimization and/or enhancement of the network architecture may include refining and/or improving the cyber defense measures associated with the network architecture. Refining and/or improving the cyber defense measures may reduce the adverse consequences of a cyber-attack.

The cyber risk analysis tool may consider the overall network architecture, the vulnerabilities of the architecture based on security systems and policies, and the risks/costs associated with individual assets (e.g., data) that are stored on individual workstations and nodes in the network. In this manner, the cyber risk analysis tool can provide an extremely granular output regarding the risks associated with an attack based on the network architecture and the identity of individual data items stored across the network nodes. In this manner, changes in where specific information assets are stored, changes in security protocols on one or more devices, and/or changes in the network architecture may affect the result of the threat analysis. Thus, the analysis may be used in order to modify the examined network in order to be more resilient against or otherwise lower the risks associated with one or more types of cyber-attacks.

Such an output may be expressed in numerous ways, such as overall measures of impacts an attack would have on a corporate income statement, a balance sheet, and/or reputation. The cyber risk analysis tool may be configured to be independent of the form in which the output is presented. In other words, the output of the cyber risk analysis tool may be transposed to almost any quantifiable measure that can be used to express the impact associated with one or more cyber-attacks or cyber threats.

The cyber risk analysis tool may concatenate a plurality of individual system analyses to determine the potential impacts of various cyber threats. The analyses may include one or more of a threat assessment (e.g., identification of potential threats to the network), a behavioral analysis (e.g., analyzing how the network is interconnected and/or how a threat could proliferate within the network), an operational impact analysis (e.g., identifying the severity of the impact associated with the compromise of different data or systems within the network), a sentimentality analysis (e.g., determining how different threats or losses may affect the reputation or trustworthiness of the overall system or enterprise), and/or an enterprise impact analysis (e.g., determining how the overall system or enterprise would be affected by the different potential attacks).

The cyber risk analysis tool may include a data repository and/or memory for storing data used to perform the cyber threat analysis. The data repository may store threat data, infrastructure data, departmental operation data, sentiment data, and/or enterprise information data. The data repository may organize and/or categorize each type of information. For example, data and/or results of each of the analyses of the cyber risk analysis tool may be stored and/or formatted for further analysis. The individual system analyses modules or engines may be integrated into the overall cyber risk analysis tool in order to define a consistent analytical flow analysis across various systems and networks. One or more cyber threats (e.g., threat vectors) may be applied to the enterprise to determine the impacts associated with the one or more cyber threats. The resulting impacts may be assessed and further analyzed to determine department, sentiment, and/or enterprise impacts associated with the one or more cyber threats.

Figure 1:
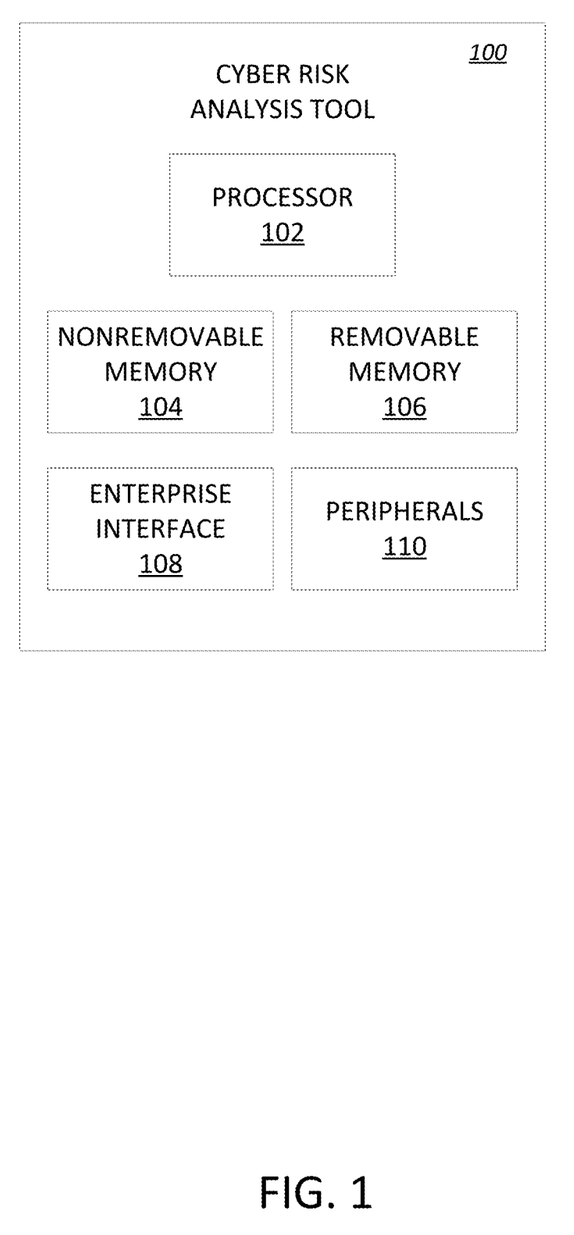
FIG. 1 depicts an example cyber risk analysis tool.

FIG. 1 depicts an example cyber risk analysis tool 100. The example cyber risk analysis tool 100 may include one or more of a processor 102, a non-removable memory 104, a removable memory 106, an enterprise interface 108, and/or one or more peripherals 110. The enterprise interface 108 of the example cyber risk analysis tool 100 may represent data entry via the one or more peripherals 110. Data and/or results of one or more analysis may be stored in the non-removable memory 104 and/or the removable memory 106. The processor 102 may perform the processing required to perform the cyber risk analysis as described herein and the non-removable memory 104 and/or a removable memory 106 may store computer readable instructions that are implemented by the processor to perform the processing tasks.

Processor 102 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The processor 102 may perform data processing, input/output processing, instantiate operating system(s), execute application(s), and/or any other functionality that enables cyber risk analysis tool functions described herein.

Non-removable memory 104 and/or removable memory 106 may include volatile and/or non-volatile memory. Non-removable memory 104 and/or removable memory 106 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Non-removable memory 104 and/or removable memory 106 may be configured to store computer readable instructions that when implemented by processor 102 may cause processor 102 to implement one or more of the functions or procedures described herein. For example, non-removable memory 104 and/or removable memory 106 may be configured to store software code implemented by processor 102 perform one or more functions described herein as being part of or performed by the cyber threat analysis tool.

Figure 2:
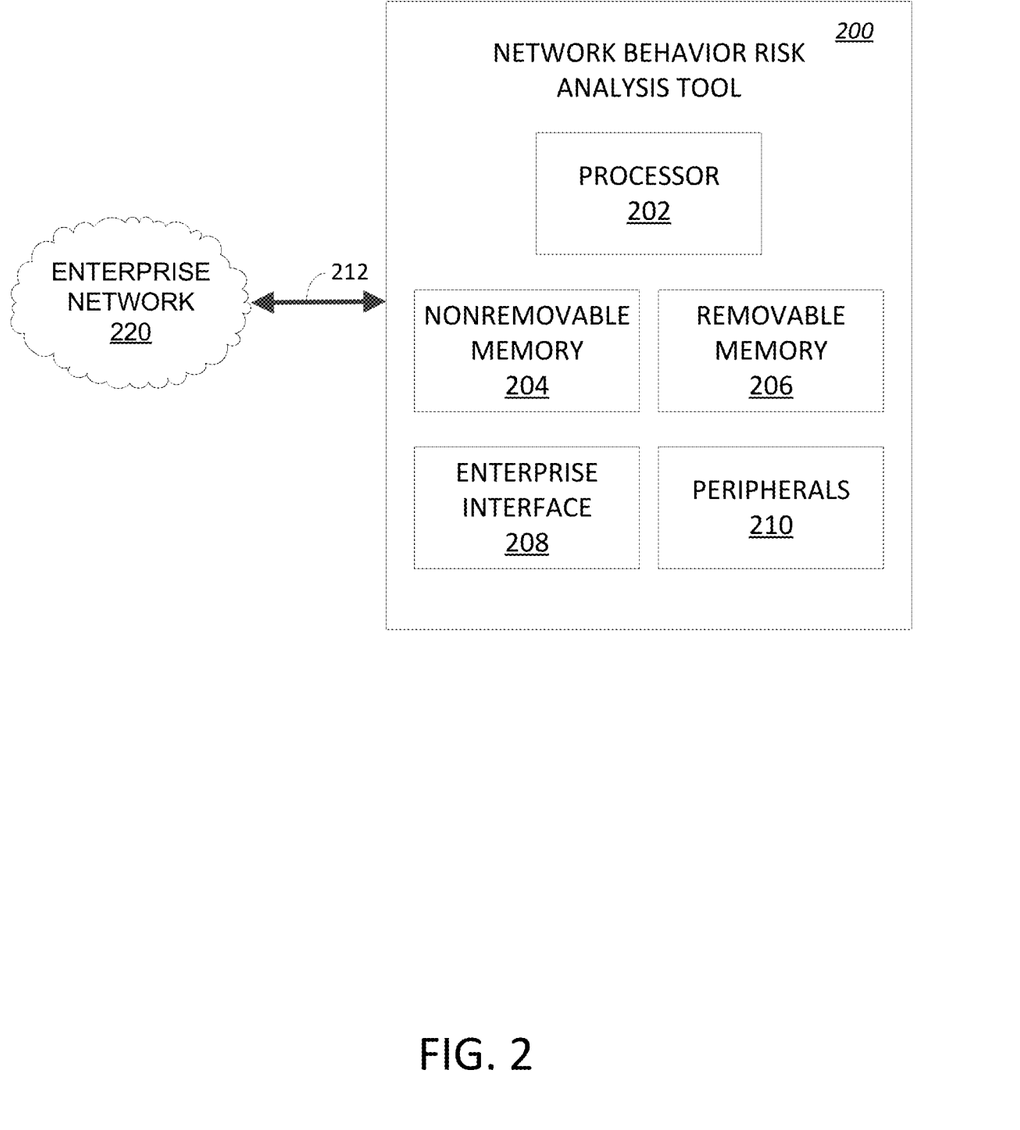
FIG. 2 depicts an example network behavior risk analysis tool that receives enterprise network artifacts from an enterprise network.

FIG. 2 depicts an example network behavior risk analysis tool 200 (e.g., which may be a portion of and/or an example of cyber risk analysis tool 100) that may include an enterprise connection 212 to an enterprise network 220. The network behavior risk analysis tool 200 may be configured to receive one or more data artifacts from the enterprise network 220. For example, the data artifacts may be received (e.g., pulled) from the enterprise network 220 during a discovery procedure. The discovery procedure may be used to provide network behavior risk analysis tool 200 with information about the enterprise network 220 and/or about the information stored on the enterprise network 220. The network behavior risk analysis tool 200 may include a processor 202, a non-removable memory 204, a removable memory 206, an enterprise interface 208, and one or more peripherals 210 (e.g., in a similar manner as cyber risk analysis tool 100). For example, the enterprise connection 212 may provide an information pathway between the network behavior risk analysis tool 200 and the enterprise network 220. The network behavior risk analysis tool 200 may, via the enterprise interface 208, use the data artifacts received from the enterprise network.

Figure 4:
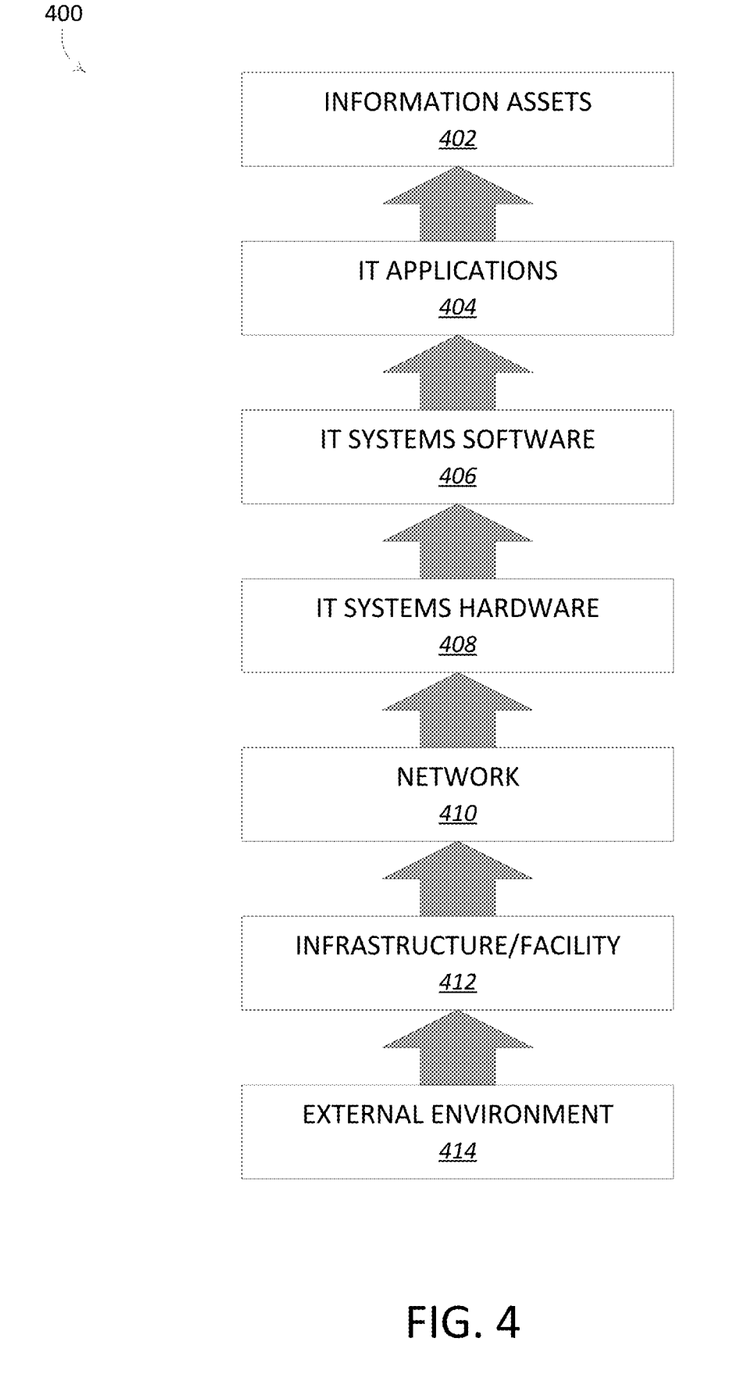
FIG. 4 depicts an example layers of an enterprise architecture.

The network behavior risk analysis tool 200 may generate (e.g., render) a digital model of the computing infrastructure of the enterprise, for example using data received from the enterprise network 220. The digital model may include one or more layers of the enterprise architecture (e.g., as shown in FIG. 4). The digital model may include one or more physical and/or logical paths for data movement between individual components of the computing infrastructure. The digital model may include one or more controls that may prohibit such data movement. The digital model may be generated in part based on one or more network policies (e.g., security polices) determined from the network analysis. For example, the digital model may represent interconnection between nodes and may indicate the types of data transfers that are allowed and/or disallowed between nodes. The digital model may incorporate the protocols used for communicating between nodes.

The network behavior risk analysis tool 200 may receive, via the enterprise interface 208, data for use in one or more analyses of the cyber risk analysis. For example, the received data may be used to determine an enterprise architecture. The enterprise connection 212 may include a server (not shown) that interfaces with the enterprise network 220 and the network behavior risk analysis tool 200. The server may include proper security measures to prevent unauthorized access to the enterprise network 220.

Figure 3:
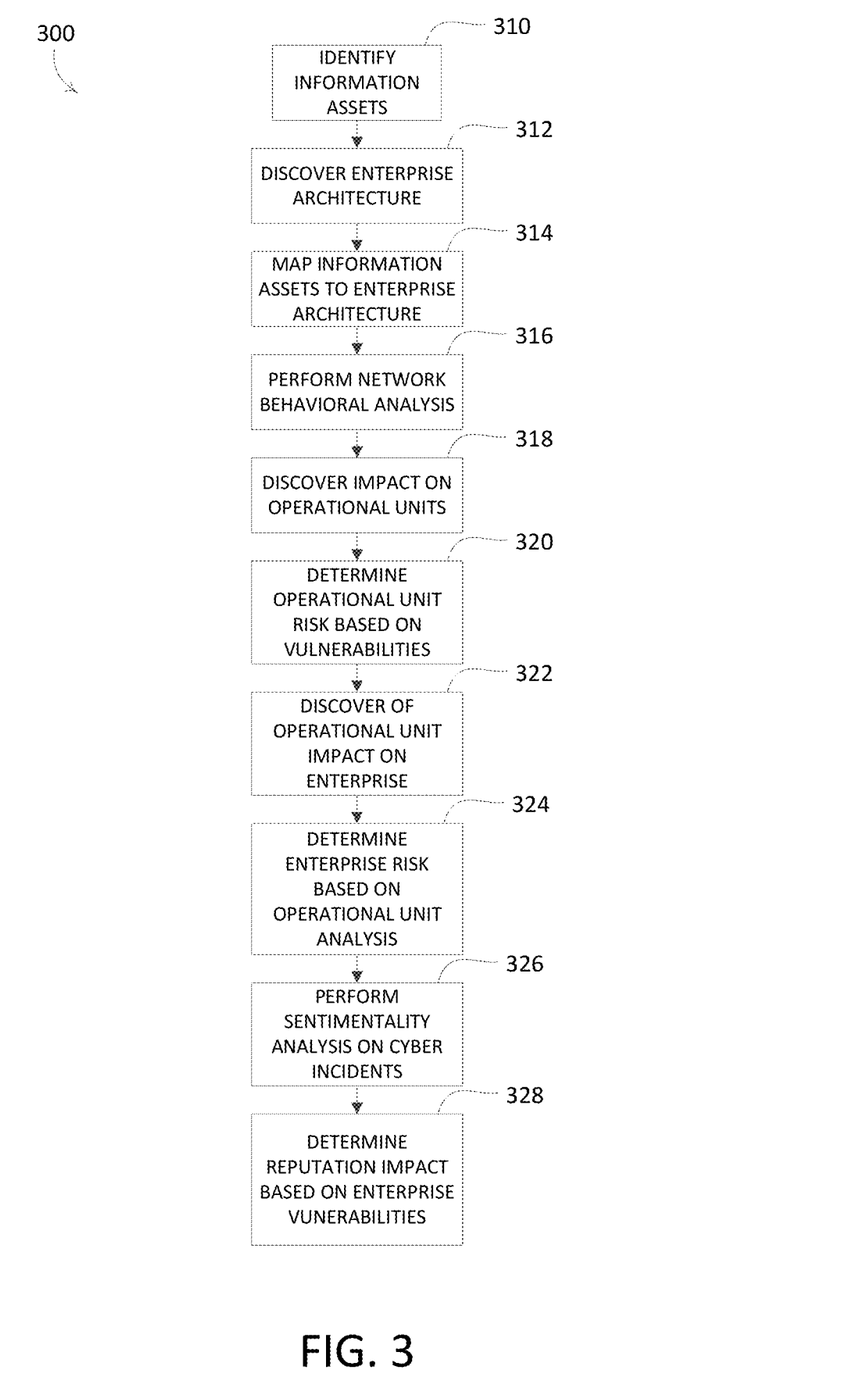
FIG. 3 depicts an example of the functions performed by the cyber risk analysis tool.

FIG. 3 provides an example enterprise risk analysis process 300 that may be performed by a cyber risk analysis tool (e.g., such as the cyber risk analysis tool 100 shown in FIG. 1) and/or a network behavior risk analysis tool (e.g., such as the network behavior risk analysis tool 200 shown in FIG. 2). As an overview, the cyber risk analysis tool may include one or more functional modules or engines configured to perform elements of an enterprise risk analysis process. The modules or engines may be implemented via separate, dedicated hardware components and/or via one or more common hardware components.

For example, the cyber risk analysis tool may be configured to identify information assets within an enterprise system at 310, discover the enterprise architecture at 312, map the identified information assets to one or more network elements in the discovered enterprise architecture at 314, perform a network behavioral analysis at 316, discover impacts affecting one or more operational units of the enterprise at 318, determine operational unit risk based on the identified vulnerabilities (e.g., perform a transposition of vulnerabilities to operational unit impact) at 320, discover and/or aggregate the impact of one or more operational units on the enterprise at 322, determine enterprise risk based on the analysis of one or more operational units (e.g., perform a transposition of vulnerabilities to enterprise impact) at 324, perform a sentimentality analysis on cyber incidents at 326, determine reputational impact based on the enterprise vulnerabilities (e.g., perform a transposition of vulnerabilities to reputation impact) at 328, and/or the like.

The cyber risk analysis tool may receive data associated with an enterprise architecture. The cyber risk analysis tool may be configured to identify one or more information assets, at 310. The one or more information assets may be identified using the enterprise architecture, for example, based on the data associated with the enterprise architecture. An information asset may be a collection of data that is of value to the operation of the enterprise. For example, an information asset may include a body of knowledge that is organized and/or managed as a single entity. As an example, the credits and debits information stored in a banking network may be identified as an information asset. The cyber risk analysis tool may determine an information asset at an appropriate level such that the resulting data provides actionable insight into cyber risk(s) and allows for differentiated treatment of different types of informational assets during the threat analysis. Information assets may be identified for each node in the network. In this manner, a granular analysis may be performed where each node is analyzed in accordance with the individual information assets stored on or accessible to that node. Examples of information assets may include one or more of publicly available data, enterprise employee data, enterprise customer data, entity vendor data, enterprise proprietary data (e.g., which may comprises different types of proprietary data that are characterized as different types of information assets in the analysis), enterprise trade secret data, enterprise cyber security data (e.g., network architecture data, user credentials, cyber security software information, etc.), enterprise software and/or source code information, and/or the like.

These examples of the types of informational assets that may be stored within the enterprise network being analyzed are not meant to be exhaustive and as may be appreciated different networks and systems may identify the informational assets in different ways. In other words, what constitutes an information asset for a given analysis may be dependent on the type of network and/or enterprise service being identified. For example, returning to the banking example, customer identification information may be considered another information asset held within a banking enterprise network. In another example for a utility enterprise network, past billing and/or usage information may be considered an information asset. Listings of login credentials for accessing online applications may be considered another example of an information asset. The information assets may be any class of digitally stored information that is stored within the enterprise network. Example representations of information assets may include relational databases, spreadsheets, documents, directories, and/or files.

An enterprise may manage a plurality of information assets. The cyber risk analysis tool may be configured to identify mechanisms by which an information asset may be compromised and/or consequences compromising such an information asset. For example, one or more of the confidentiality, integrity, and/or availability of each information asset may be compromised by an attack. Depending on the nature of the informational asset, attacks that compromise the confidentiality, integrity, and/or availability of the asset can have drastically different effects on the underlying network and enterprise depending on the type of information asset and the nature of the compromise. For example, compromising the confidentiality of an information asset that corresponds to publicly available data may have relatively low impacts on the network and enterprise functions, but compromising the integrity or availability of such data may have a greater impact if such publicly available data is relied on by an aspect of a system being utilized by the enterprise network. In another example, a denial of service attack that prevents the enterprise from accessing confidential customer data may have an impact on the enterprise, but a compromise that affects the confidentiality of such data may be much more serious due to claims the customers may have against the enterprise due to the enterprise's loss of such information.

The compromise of an information asset as a result of an unplanned activity may be referred to as a cyber event. A cyber event may have a negative impact on the enterprise. The cyber risk analysis tool may quantify an impact of one or more compromises of each information asset under each cyber event. The cyber risk analysis tool may quantify the effect of one or more cyber events on the enterprise.

The cyber risk analysis tool may be configured to discover the enterprise architecture, at 312. For example, a variety of computer network configurations may be utilized within a given enterprise network. The specific network configuration may affect the vulnerability of different information assets. The cyber risk analysis tool may be configured to discover an enterprise network architecture, at 312 in order to evaluate how different types of threats may affect different portions of the network in different ways.

The cyber risk analysis tool may include a discovery of the existing enterprise architecture supporting the enterprise's mission. For example, data associated with the enterprise architecture may be input to the cyber risk analysis. The data associated with the enterprise architecture may include one or more artifacts. The one or more artifacts may include network diagrams, packet captures, log files, policies, procedures, and/or interview results. Upon determining the enterprise architecture, the cyber risk analysis tool may develop a model or framework for the network physical components and/or the components functional organization and configuration, the network operational principles and procedures, the data formats used in network operation, permissions and protocols for protecting data, and/or the like. The one or more artifacts may be used to determine a model for the enterprise architecture. The model for the enterprise architecture may be used as an input to a network behavioral modeling. The model may represent how data is allowed to flow within the network and/or indicate the interconnections between various network components.

The cyber risk analysis tool may be configured to map the one or more information assets to the enterprise architecture, at 314. For example, one or more IT systems that process, store, and/or transmit each information asset may be identified. The cyber risk analysis tool may map an information asset to the one or more IT systems that processes, stores, and/or transmits the information asset. The one or more IT systems must be accounted for at one or more (e.g., every) layer of the architecture (e.g., to accommodate evaluation of cyber incidents caused at any layer of the architecture). Returning to the banking example, a first sub-network and/or database within the enterprise banking network may store user credentials for online banking. A second sub-network and/or database within the enterprise banking network may store debits and credits information. A third sub-network and/or database within the enterprise banking network may store proprietary trading positions. The cyber risk analysis tool may be configured to map each of the identified information assets to an appropriate portion of the enterprise network architecture. In this matter, the positions of each of the identified information assets with different network nodes may be used in the analysis in order to identify which information assets would be affected by breaches in different portions of the network.

At 316, the cyber risk analysis tool may perform a network behavioral analysis. The network behavior risk analysis tool may be performed based on known vulnerabilities identified from one or more sources. For example, cyber threats may be identified from open source data, for example, such as the National vulnerability database. The digital model of the network with the mapping of the informational assets may be subjected to simulated attacks. The simulated attacks may represent cyber adversaries with varying levels of sophistication, motive, and/or funding. The simulated attacks may be simulated to attempt to exploit known vulnerabilities. The network behavior risk analysis tool may simulate a multi-stage attack against the infrastructure. The network behavior risk analysis tool may measure the progress of the attacker and/or the ability of the attacker to leverage exploits to compromise one or more information assets. For example, the behavioral analysis may simulate how a threat is able to traverse the nodes of the enterprise network based on the configuration of the enterprise network. Different types of threats may affect the network and/or traverse security features of the network in different ways in the behavioral analysis. For example, a first threat (e.g., a nation state attack) may be simulated to traverse more nodes within the network than a second threat (e.g., an attack from a private entity).

Thus, the behavioral analysis may examine how a plurality of differing cyber-attacks or threats may operate (e.g., operate differently) within the nodes of a network architecture of a network and may examine how such threats may be able to compromise different information assets spread across the different nodes of the network. Further, the behavioral analysis may simulate how different threats may affect one or more of the confidentiality, integrity, and/or availability of the information assets spread across the different nodes of the architecture of the enterprise network. For example, a first threat may be simulated to compromise the confidentiality and integrity of a first set of informational assets spread across a first set of nodes. A second threat may be simulated to compromise the availability of a second set of informational assets spread across a second set of nodes. A third threat may be simulated to compromise the confidentiality, integrity, and availability of both the first set of information assets spread across the first set of nodes and of the second set of informational assets spread across the second set of nodes, and so on. Thus, the behavioral analysis may comprise granular simulations of different types of attacks that affect one or more nodes of the network and thus may have one or more compromising effects (e.g., confidentiality, integrity, and/or availability) on the information assets stored on those one or more nodes. In this manner, the behavioral analysis may utilize the discovered network architecture to simulate how different types of attacks may affect varying portions of the network architecture and thus expose different types of information assets to one or more vulnerabilities based on the manner in which the information assets are stored in the network architecture.

The cumulative data from multiple simulated attacks may be used to measure the vulnerability of the computing infrastructure. The cumulative data from multiple simulated attacks may be used to measure the vulnerability to compromise of one or more specific information assets. For example, a vulnerability score may be determined for the one or more specific information assets. The vulnerability score may represent the vulnerability to compromise of confidentiality, integrity, and/or availability of the respective asset. An example output of the network behavior risk analysis tool 200 is shown in FIG. 8 and is explained in detail below.

The network behavioral analysis of the enterprise system may include evaluating the enterprise system under a simulated attack. The simulated attack may include applying one or more preconfigured threat vectors to the enterprise system. A threat vector may be a cyber threat that may include one or more adversary profiles and/or a vulnerability database. For example, a single threat vector may be applied to various information assets of the enterprise system. As another example, multiple threat vectors may be applied to the one or more information assets of the enterprise system. The one or more preconfigured threat vectors may include one or more of environmental, local situational, hostile, incidental, and/or accidental threats. The combination of threat vectors used may be dependent on the specific enterprise. For example, the environmental threat vectors may be different for enterprises located at different places. In another example, the hostile threat vectors may depend on the operator of the enterprise network. For example, a banking network may have different hostile threats than a network used to support a power utility or a medical facility.

A local situational threat may, for example, represent a threat that impacts one or more employee's ability to get to work. The one or more preconfigured threat vectors may be applied to an enterprise system hosting one or more information assets of the enterprise system. The one or more preconfigured threat vectors may propagate into and/or through the enterprise system. The propagation of the one or more preconfigured threat vectors may be determined and/or tracked. For example, how the one or more preconfigured threat vectors result in a compromise of confidentiality, integrity, and/or availability of the information assets (e.g., a cyber incident) may be determined. An output of the network behavioral analysis may include an identification of one or more vulnerabilities of the enterprise system. For example, one or more vulnerabilities of the enterprise system may be determined based on the network behavioral analysis. The one or more vulnerabilities of the enterprise system may be indexed by affected information assets and/or the threats that may compromise them. For example, a vulnerabilities matrix may be determined based on the network behavioral analysis. For integrity and availability, the vulnerabilities matrix may identify one or more time components associated with a time to detect and/or a time to restore following a cyber incident.

The cyber risk analysis tool may be configured to determine and/or discover an operational unit impact of a cyber incident, at 318. An operational unit impact associated with a cyber incident may include cost and/or revenue impacts associated with a respective operational unit. For example, an impact of erosion or compromise of one or more information assets may be determined based on input from one or more operational units of the enterprise and may be expressed in terms that effect a defined objective of the enterprise. For example, if the enterprise objective parameters include corporate earnings, an operational unit impact of a cyber incident may include the impact on earnings for compromise of confidentiality, integrity, and/or availability for each information asset. The impacts may be represented as impact over time (e.g., since integrity and availability compromises are temporal in nature). An output of the operational unit impact determination may include an operational cost matrix. The operational cost matrix may include data based on information asset and compromise type (e.g., confidentiality, integrity, and/or availability).

One or more vulnerabilities may be transposed to one or more operational unit impacts. For example, the vulnerability matrix may be transposed to an operational cost matrix for each operating unit. The vulnerability matrix may be transposed to the operational cost matrix by aligning the matrices such that one or more (e.g., three) elements of cost data for each information asset are aligned with each row of the vulnerability matrix for each respective information asset. One or more vulnerability scores from the network behavioral analysis may be multiplied against the impact data from the operational impact matrix. Transposing the one or more vulnerabilities to the one or more operational unit impacts may determine an operation impact matrix.

The determined operational impact matrix may be filtered, queried, and/or sorted to identify the impact on the enterprise objective of any information asset from any threat in any department. Two or more operational impact matrices and/or the data therein may be further aggregated at the enterprise level.

An operational unit impact on the enterprise may be discovered and/or aggregated at 322. For example, two or more operational impact matrices may be aggregated to determine an enterprise level impact. Determining the enterprise level impact may be more complicated than a simple sum of the operational impacts (e.g., because two or more operational impacts to different operating units may intersect or offset). Discovery and/or aggregation of two or more operational impact matrices may result in an enterprise level impact matrix. The enterprise level impact matrix may have the same format as the two or more operational unit matrices. The enterprise level impact matrix may indicate one or more measures of risk consequence. The one or more measures of risk consequence may be associated with one or more threat vectors and/or one or more information assets. For example, the enterprise level impact matrix may indicate a risk consequence score for one or more threats and/or one or more information assets. A vulnerability score may be determined for the one or information assets. The vulnerability score may represent the vulnerability to compromise of confidentiality, integrity, and/or availability of the respective asset.

One or more vulnerabilities may be transposed to one or more enterprise impacts. For example, the vulnerability matrix may be transposed to one or more enterprise impact matrices (See e.g., FIG. 9) such that one or more elements of each enterprise impact matrix is aligned with each row of the vulnerability matrix for each respective information asset. The one or more vulnerability scores form the network behavioral analysis may be multiplied against the impact data from the enterprise impact matrices. An enterprise impact matrix may be determined from transposition of the vulnerability matrix with the one or more enterprise cost matrices.

After transposition, the resulting enterprise impact matrix may be filtered, queried, and/or sorted to identify the impact on the enterprise objective of any information asset from any threat on the entire enterprise. For example, the enterprise impact matrix may quantify (e.g., in monetary terms) the impact of various threats on one or more information assets of the enterprise. The enterprise impact matrix may indicate one or more measures of risk consequence associated with the one or more information assets and/or the threat(s).

The cyber risk analysis tool may include a sentimentality analysis at 326. The sentimentality analysis may be performed on one or more cyber incidents.

The cyber risk analysis tool may determine a reputation impact based on one or more enterprise vulnerabilities, at 328. For example, one or more reputational scores may be determined and/or maintained using a sentimentality engine. The one or more reputational scores may indicate a public and/or a market perception. The sentimentality engine may process public news reports and/or social media to determine how different types of cyber incidents affect investor and/or public sentiment. The sentimentality engine may determine (e.g., score) one or more reputational impacts using a direction (e.g., positive or negative reaction) and a magnitude. The one or more reputational impacts may be maintained (e.g., classified) based on the type of cyber incident (e.g., confidentiality, integrity, and/or availability) and/or the type of information compromised by the cyber incident. A reputational impact matrix may be determined as an output of the sentimentality analysis.

One or more vulnerabilities may be transposed to the one or more reputational impacts. For example, the vulnerability matrix may be transposed to the reputational impact matrix (e.g., the output of the sentimentality analysis) such that the three types of cyber incident and the type of information asset are lined up with each row of the vulnerability matrix for each respective information asset. The one or more vulnerability scores from the network behavioral analysis may be multiplied against the one or more reputational impacts (e.g., scores) from the sentimentality analysis.

The reputational impact associated with a cyber event may be distinct from the enterprise objective factors. A reputation consequence may provide an important attribute for enterprise leaders in deliberation of policy.

One or more operational unit matrices and one or more perturbation impacts may be used to determine one or more enterprise level measures of risk consequence. Each of the one or more enterprise level measures of risk consequence may be associated with a cyber threat and/or an information asset. The one or more enterprise level measures of risk consequence may include one or more of an earnings per share impact, a capital impact, a volatility impact, a shareholder confidence impact, a public impact, and/or a customer impact.

FIG. 4 depicts example layers of an enterprise architecture 400 which may be used to assist in defining the enterprise architecture 400. For example, the enterprise architecture 400 may be associated with a predetermined hierarchy. The predetermined hierarchy may include a plurality of levels (e.g., organizational echelons). The enterprise architecture 400 may include an external environment layer 414. The external environment layer 414 may include components external to the enterprise architecture 400. For example, the external environment layer 414 may include weather patterns, natural disasters, etc. The enterprise architecture 400 may include an infrastructure/facility layer 412. The infrastructure/facility layer 412 may include one or more infrastructures and/or facilities. The one or more infrastructures and/or facilities may represent one or more buildings and/or the infrastructure therein. The enterprise architecture 400 may include a network layer 410. For example, the network layer 410 may include one or more networks used by the enterprise. The enterprise architecture 400 may include an IT system hardware layer 408. The enterprise architecture 400 may include an IT system software layer 406. For example, the IT system hardware layer 408 and/or the IT system software layer 406 may include hardware and/or software that operates on the one or more networks. The enterprise architecture 400 may include an IT applications layer 404. The IT applications layer 404 may include one or more IT applications. The enterprise architecture 400 may include an information assets layer 402. The information assets layer 402 may include one or more information assets. The information assets layer 402 may represent a top layer of the enterprise architecture 400 such that the each of the one or more information assets may be mapped to one or more of the other enterprise architecture layers.

Figure 5:
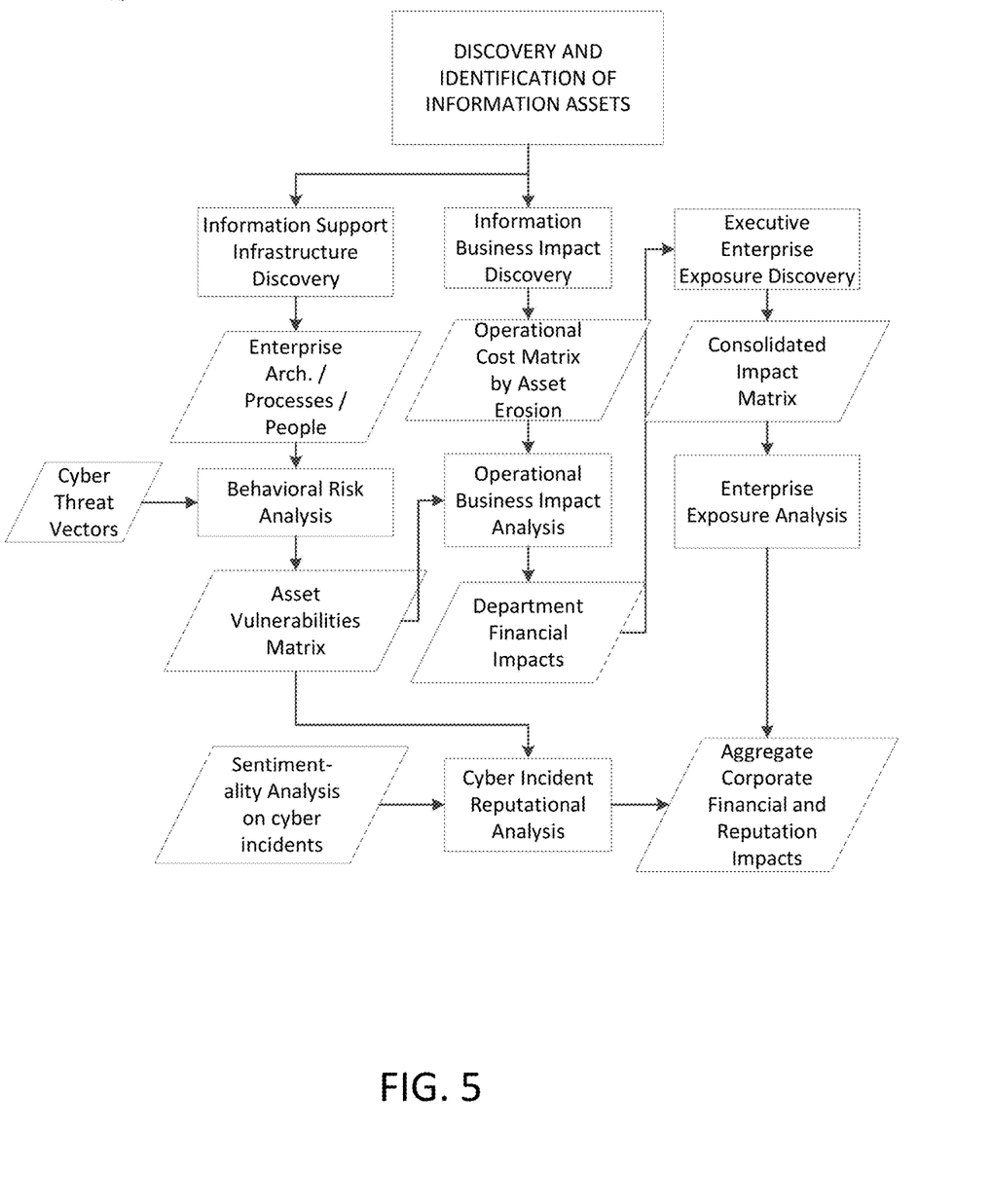
FIG. 5 depicts an example cyber risk analysis flow chart.

FIG. 5 is a flow chart depicting an example cyber risk analysis 500. The cyber risk analysis 500 may begin with discovery and/or identification of one or more information assets. The example cyber risk analysis 500 may determine aggregate corporate financial and/or reputation impacts associated with applying one or more cyber threat vectors to a behavioral risk analysis. A cyber threat vector may include one or more adversary profiles and/or a vulnerability database.

Figure 6:
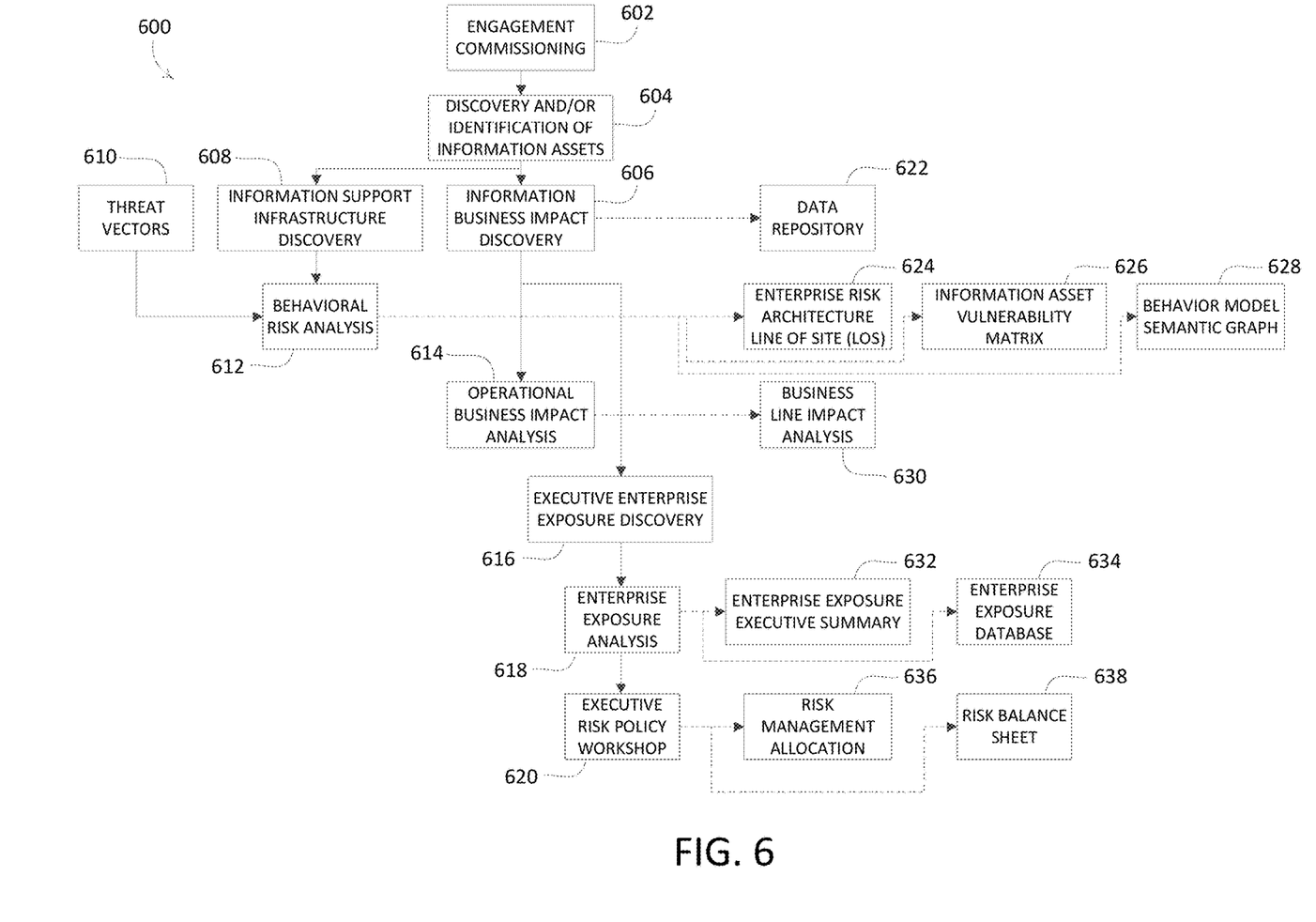
FIG. 6 depicts an example cyber risk analysis flow chart with one or more outputs.

FIG. 6 is a flow chart depicting an example cyber risk analysis 600 with one or more outputs as customer deliverables. The cyber risk analysis 600 may be implemented by a cyber risk analysis tool (e.g., such as cyber risk analysis tool 100 shown in FIG. 1). The cyber risk analysis tool may include an engagement commissioning 602. The cyber risk analysis tool may include discovery and/or identification of one or more information assets 604. The discovered and/or identified information assets may be use to discover an information business impact 606 and/or an information support infrastructure 608. A behavioral risk analysis 612 may be performed using one or more threat vectors 610 and/or the discovered information support infrastructure. An operational business impact analysis 614 may be performed using the discovered information business impact. The cyber risk analysis tool may include an executive enterprise exposure discovery 616. The executive enterprise exposure discovery 616 may be performed using the discovered information business impact. An enterprise exposure analysis 618 may be performed using the discovered executive enterprise exposure. An executive risk policy workshop 620. The executive risk policy workshop 620 may be based on the enterprise exposure analysis 618.

The output of the cyber risk analysis 600 may include one or more customer deliverables such as an enterprise exposure executive summary 632, an enterprise exposure database 634, a business line impact analysis 630, an enterprise risk architecture line of sight (LOS) 624, an information asset vulnerability matrix 626, or a behavior model semantic graph 628. The output of the cyber risk analysis tool may include a data repository 622, a risk management allocation 636, and/or a risk balance sheet 638. The cyber risk analysis tool may store the discovered business impact 606 in the data repository 622. One or more of the enterprise risk architecture LOS 624, the information asset vulnerability matrix 626, or the behavior model semantic graph 628 may be determined based on the behavioral risk analysis 612. The business line impact analysis 630 may be performed based on the operational business impact analysis 614. The enterprise exposure executive summary 632 and/or the enterprise exposure database 634 may be based on the enterprise exposure analysis 618. The risk management allocation 636 and/or the risk balance sheet 638 may be based on the executive risk policy workshop 620.

Returning to the banking enterprise example, a banking network may be associated with a banking enterprise architecture. One or more information assets may be determined for the banking network. The one or more banking information assets may include a credit and debit banking system, a personal identifiable information (PII) database, a trading information system, etc. Each of the one or more banking information assets may reside on a separate firewalled network. The one or more banking information assets may be separated with varying strengths of separation, for example. The one or more banking information assets may be mapped to the banking enterprise architecture (e.g., one or more IT systems that processes, stores, and/or transmits the one or more banking information assets). For example, the credit and debit banking system information asset may be mapped to one or more servers, a mainframe, and/or one or more routers. As part of a behavioral impact analysis, as described herein, the cyber risk analysis tool may apply one or more threat vectors to the banking enterprise's architecture and/or infrastructure. One or more vulnerabilities of the banking enterprise's architecture and/or infrastructure may be determined based on the behavioral impact analysis. A banking enterprise vulnerability matrix may be determined based on the one or more vulnerabilities. The banking enterprise vulnerability matrix may be organized by threat vector and/or information asset. A banking operational cost matrix may be determined based on the one or more threat vectors and/or one or more banking system information assets. The banking operational cost matrix may include one or more banking operational units.

Figure 7:
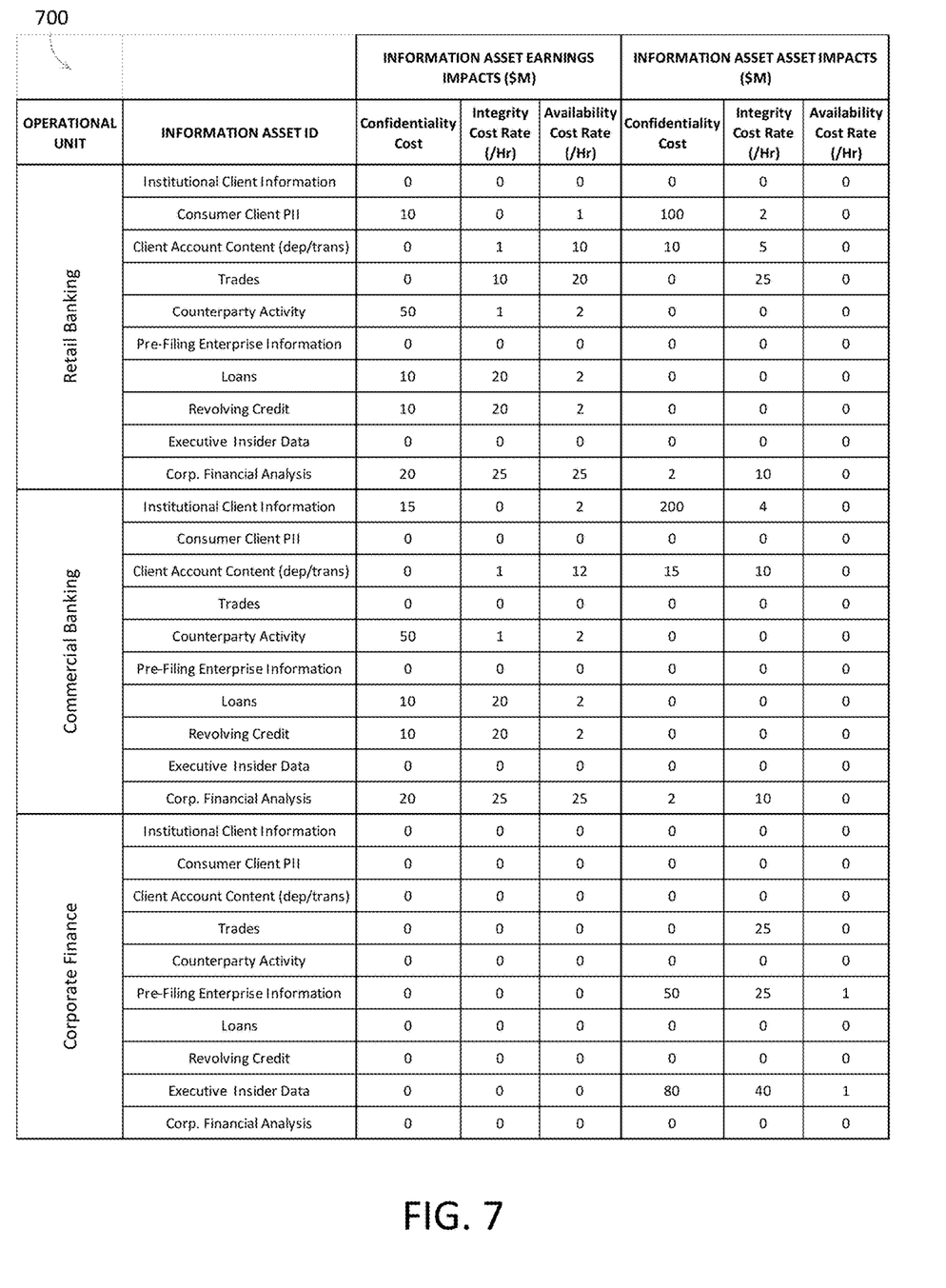
FIG. 7 depicts an example of an operational cost matrix.

FIG. 7 depicts an example operational impact matrix 700 for a banking enterprise. The operational impact may generally indicate how differing types of vulnerabilities (e.g., loss of confidentiality, loss of integrity, loss of availability, etc.) may have differing levels of impact/effect on different operations within the enterprise. For example, the banking enterprise may include a retail banking operation and a commercial banking operation. The retail banking operation may include one or more of retail deposits, retail lending, home loans, and/or legacy assets & servicing. The commercial banking operation may include one or more of investment banking, commercial lending, wealth management, and/or trading operations. These different operations, and the information assets associated by the different operations, may be more or less affected by different types of vulnerabilities. For example, loss of confidentiality of counterparty activity for a retail banking operation may have a relatively large impact on the operation, while loss of confidentiality of revolving credit information may have relatively smaller impact on the operation. Similar analysis may be performed for integrity and/or availability of the information assets. Note that the values in FIG. 7 are for explanatory purposes only and may vary depending on the specific operations and vulnerabilities.

The example operational impact matrix 700 may indicate one or more impacts to the banking operations based on the compromise type and/or the type of information asset that is compromised. For example, information assets associated with one or more operational units may each be assigned scores or other measures that indicate the relative level of susceptibility to different threats (e.g., a loss of confidentiality, a loss of integrity, a loss of availability/denial of service, etc.). Such information asset impacts may provide an indication of the relative level of vulnerability of different information assets to different attacks. The network configuration may be considered when developing threat vectors and/or when mapping the information assets to the enterprise architecture. The vulnerability impact may be expressed as an absolute value/cost and/or as a rate of the value/cost per unit of time (e.g., a rate per unit of time until detection and/or restoration of exposure of the information assets).

FIG. 8 depicts an example threat vector vulnerabilities matrix 800 for a banking enterprise. Such vulnerabilities may represent the results of the behavioral analysis. As shown in FIG. 8, the vulnerability matrix 800 may be organized by threat vector. Different threat vectors may be simulated to attack the informational assets and may result in different levels of vulnerability for each information asset, for example depending on the simulated strength of the threat (e.g., nation state v. individual actor, purposeful attack v. accidental disclosure, etc.), the node configuration of the enterprise network, and the mapping (e.g., location) of the information asset within the nodes of the enterprise network. For example, the vulnerability matrix 800 may include one or more threat vectors, such as an employee attack, a nation state attack, a hacker attack, a natural disaster, a passive threat, and/or the like. A vulnerability score for each of the one or more vulnerabilities may be determined for each threat vector. The vulnerability score may be specific to one or more of the vulnerability of the information asset to loss of confidentiality, loss of integrity, and/or loss of availability. A time to detect may be determined for each vulnerability-threat vector combination. A time to restore may be determined for each vulnerability-threat vector combination. The vulnerability matrix 800 may include the time to detect and/or the time to restore for each vulnerability-threat vector combination.

Thus, the behavioral analysis may comprise, for each information asset, determining relative levels of vulnerability with respect to a plurality of differing cyber threats. In this manner, each threat may have a different potential impact on one or more of the confidentiality, integrity, and/or availability of a given information asset, for example based on the manner in which the information asset to exposed via the nodes of the enterprise network and/or the sophistication/nature of the simulated attack. The behavioral analysis may also result in an estimated time to detect and/or time to restore the information asset with respect to the confidentiality, integrity, and/or availability of the information asset for each of the simulated threats. As shown in FIG. 8, different information assets may be simulated against the same or differing threats, and the relative vulnerabilities of the different information assets may differ, for example based on the manner in which the information assets are stored/exposed within the nodes of the enterprise network.

Figure 9:
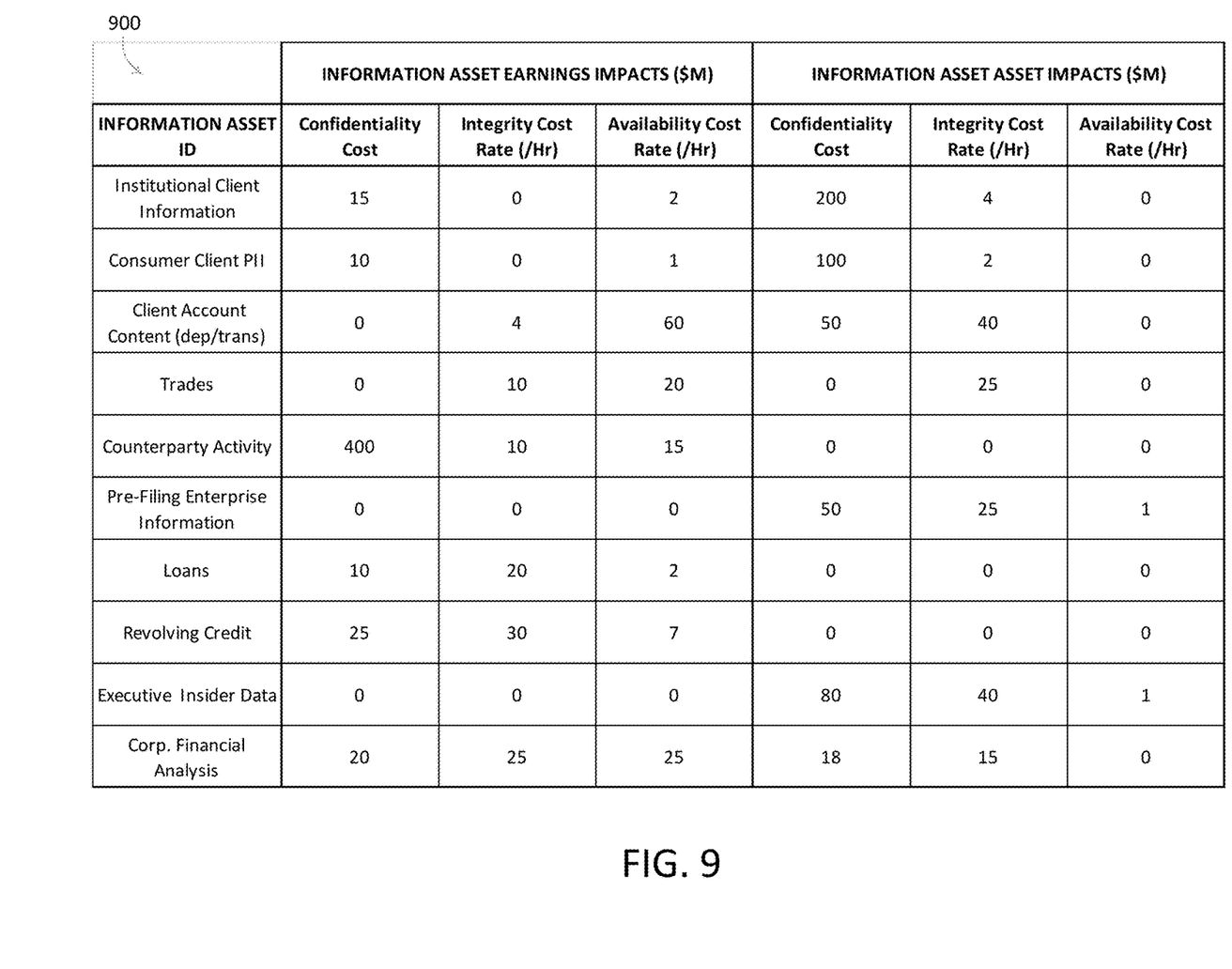
FIG. 9 depicts an example of an enterprise level impact matrix.

FIG. 9 depicts an example banking enterprise level impact matrix 900. The example banking enterprise level impact matrix 900 may be determined by aggregating one or more operational impact matrices (e.g., such as the example operational impact matrix 700 shown in FIG. 7). Thus, the enterprise impact may express, for each information asset the relative costs or risks associated with the vulnerability of the asset (e.g., in terms of loss of confidentiality cost, loss of integrity cost, and/or loss of availability cost) for the plurality of information assets within the network. In other words, the result of the behavioral analysis, which may represent the vulnerabilities of the different information assets to different threats, may be used with the result of the operation impact analysis that represents expected costs/ risks for different vulnerabilities of the information assets for different enterprise operations to determine a simulated exposure/cost/risk of the information assets to different threats based on the manner in which the information assets are mapped to the nodes of the enterprise network. The expected costs/risks for different vulnerabilities of the information assets for the different enterprise operations may be aggregated to determine an overall enterprise impact.

A cyber risk analysis tool, as described herein, may be referred to as a behavioral risk analysis system and/or a behavioral risk analysis tool.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A cyber risk analysis tool comprising a processor and memory, the cyber risk analysis tool configured to:
   receive data associated with a configuration of a network architecture of an enterprise network;
   determine one or more collections of data stored within the enterprise network;
   map the one or more collections of data to one or more nodes associated with the configuration of the network architecture of the enterprise network;
   perform a network behavioral analysis on the enterprise network to determine relative vulnerability levels of the one or more collections of data based on one or more threat vectors that represent cyber threats to the one or more collections of data;
   determine one or more operational impacts for one or more vulnerabilities associated with the one or more collections of data;
   determine a reputation impact associated with the one or more threat vectors;
   aggregate the one or more operational impacts and the reputation impact to determine an enterprise impact;
   determine one or more measures of risk associated with the relative vulnerability levels of the one or more collections of data determined from the network behavioral analysis and the enterprise impact of the one or more vulnerabilities associated with the one or more collections of data; and
   output at least one of the one or more measures of risk associated with the relative vulnerability levels of the one or more collections of data and the enterprise impact of the one or more vulnerabilities associated with the one or more collections of data.

2. The cyber risk analysis tool of claim 1, wherein the data associated with the configuration of the network architecture of the enterprise network comprises one or more of network diagrams, packet captures, log files, policies, procedures, or interview results.

3. The cyber risk analysis tool of claim 1, wherein the one or more measures of risk comprise one or more of an earnings per share impact, a capital impact, a volatility impact, a shareholder confidence impact, a public impact, or a customer impact.

4. The cyber risk analysis tool of claim 1, wherein the one or more threat vectors comprise at least one of an environmental threat, a local situational threat, a hostile threat, an incidental threat, a passive threat, or an accidental threat.

5. The cyber risk analysis tool of claim 1, wherein the one or more threat vectors comprise one or more of an adversary profile or a vulnerability database.

6. The cyber risk analysis tool of claim 1, wherein the relative vulnerability levels of the one or more collections of data comprise a relative level of vulnerability to one or more of a loss of confidentiality, a loss of integrity, or a loss of availability.

7. A method implemented by a cyber risk analysis tool, the method comprising:
   receiving data associated with a configuration of a network architecture of an enterprise network;
   determining one or more collections of data stored within the enterprise network;
   mapping the one or more collections of data to one or more nodes associated with the configuration of the network architecture of the enterprise network;
   performing a network behavioral analysis on the enterprise network to determine relative vulnerability levels of the one or more collections of data based on one or more threat vectors that represent cyber threats to the one or more collections of data;
   determining one or more operational impacts for one or more vulnerabilities associated with the one or more collections of data;
   determining a reputation impact associated with the one or more threat vectors;
   aggregating the one or more operational impacts and the reputation impact to determine an enterprise impact;
   determining one or more measures of risk associated with the relative vulnerability levels of the one or more collections of data determined from the network behavioral analysis and the enterprise impact of the one or more vulnerabilities associated with the one or more collections of data; and
   outputting at least one of the one or more measures of risk associated with the relative vulnerability levels of the one or more collections of data and the enterprise impact of the one or more vulnerabilities associated with the one or more collections of data.

8. The method of claim 7, wherein the data associated with the configuration of the network architecture of the enterprise network comprises one or more of network diagrams, packet captures, log files, policies, procedures, or interview results.

9. The method of claim 7, wherein the one or more measures of risk comprise one or more of an earnings per share impact, a capital impact, a volatility impact, a shareholder confidence impact, a public impact, or a customer impact.

10. The method of claim 7, wherein the one or more threat vectors comprise at least one of an environmental threat, a local situational threat, a hostile threat, an incidental threat, a passive threat, or an accidental threat.

11. The method of claim 7, wherein the one or more threat vectors comprise one or more of an adversary profile or a vulnerability database.

12. The method of claim 7, wherein the relative vulnerability levels of the one or more collections of data comprise a relative level of vulnerability to one or more of a loss of confidentiality, a loss of integrity, or a loss of availability.

13. A computer readable storage medium encoded with instructions capable of being executed by a processor, wherein when executing the instructions the processor is configured to implement a method comprising:

receiving data associated with a configuration of a network architecture of an enterprise network;

determining one or more collections of data stored within the enterprise network;

mapping the one or more collections of data to one or more nodes associated with the enterprise network;

performing a network behavioral analysis on the enterprise network to determine relative vulnerability levels of the one or more collections of data based on one or more threat vectors that represent cyber threats to the one or more collections of data;

determining one or more operational impacts for one or more vulnerabilities associated with the one or more collections of data;

determining a reputation impact associated with the one or more threat vectors;

aggregating the one or more operational impacts and the reputation impact to determine an enterprise impact;

determining one or more measures of risk associated with the relative vulnerability levels of the one or more collections of data determined from the network behavioral analysis and the enterprise impact of the one or more vulnerabilities associated with the one or more collections of data; and     outputting at least one of the one or more measures of risk associated with the relative vulnerability levels of the one or more collections of data and the enterprise impact of the one or more vulnerabilities associated with the one or more collections of data.

14. The computer readable storage medium of claim 13, wherein the received data identifies one or more of network diagrams, packet captures, log files, policies, procedures, or interviews.

15. The computer readable storage medium of claim 13, wherein the one or more measures of risk comprise one or more of an earnings per share impact, a capital impact, a volatility impact, a shareholder confidence impact, a public impact, or a customer impact.

16. The computer readable storage medium of claim 13, wherein the one or more threat vectors comprise at least one of an environmental threat, a local situational threat, a hostile threat, an incidental threat, a passive threat, or an accidental threat.

17. The computer readable storage medium of claim 13, wherein the one or more threat vectors comprise one or more of an adversary profile or a vulnerability database.

\* \* \* \* \*